(12) United States Patent
Lehner et al.

(10) Patent No.: US 8,112,214 B2
(45) Date of Patent: Feb. 7, 2012

(54) MODEL BASED VEHICLE OVERSPEED ALGORITHM

(75) Inventors: Chad W. Lehner, Howell, MI (US);
Richard H. Clutz, Howell, MI (US);
William G. Howell, Brighton, MI (US);
Mark T. Hutchinson, Oak Park, MI
(US); Richard B. Jess, Haslett, MI (US);
Bahram Younessi, Farmington, MI
(US); Ronald C. Allison, Clio, MI (US)

(73) Assignee: GM Global Technology Oprations LLC

( * ) Notice: Subject to any disclaimer, the term of this patent is extended or adjusted under 35 U.S.C. 154(b) by 1105 days.

(21) Appl. No.: 11/946,222

(22) Filed: Nov. 28, 2007

(65) Prior Publication Data

US 2008/0228366 A1  Sep. 18, 2008

Related U.S. Application Data

(60) Provisional application No. 60/918,613, filed on Mar. 16, 2007.

(51) Int. Cl.
*B60K 31/04* (2006.01)

(52) U.S. Cl. .................... 701/93; 701/110; 180/179

(58) Field of Classification Search .............. 701/93
See application file for complete search history.

(56) References Cited

U.S. PATENT DOCUMENTS

| | | | | |
|---|---|---|---|---|
| 3,763,954 A | * | 10/1973 | Permut et al. ........... | 180/167 |
| 4,843,553 A | * | 6/1989 | Ohata .................... | 701/93 |
| 4,911,259 A | * | 3/1990 | Dogahara et al. ......... | 180/170 |
| 4,984,545 A | * | 1/1991 | Kaneyasu et al. ......... | 123/399 |
| 5,048,631 A | * | 9/1991 | Etoh ..................... | 180/179 |
| 5,197,008 A | * | 3/1993 | Itoh et al. ................ | 701/70 |
| 5,243,526 A | * | 9/1993 | Ito et al. ................. | 701/90 |
| 5,625,558 A | * | 4/1997 | Togai et al. ............... | 701/93 |
| 5,665,026 A | * | 9/1997 | Linden ................... | 477/108 |
| 6,081,761 A | * | 6/2000 | Harada et al. ............. | 701/72 |
| 6,370,470 B1 | * | 4/2002 | Yamamura et al. ........ | 701/96 |
| 6,487,489 B2 | * | 11/2002 | Schmitt et al. ........... | 701/93 |
| 6,819,995 B2 | * | 11/2004 | Bellinger ................ | 701/53 |
| 7,003,394 B2 | * | 2/2006 | Takahashi et al. ......... | 701/104 |
| 7,254,472 B2 | * | 8/2007 | Larsen et al. ............. | 701/54 |
| 7,801,658 B2 | * | 9/2010 | Ohshima ................. | 701/93 |
| 2001/0044689 A1 | * | 11/2001 | Schmitt et al. ........... | 701/93 |
| 2002/0133288 A1 | * | 9/2002 | Minami et al. ............ | 701/114 |
| 2003/0141128 A1 | * | 7/2003 | Hessmert et al. .......... | 180/233 |
| 2004/0049333 A1 | * | 3/2004 | Kustosch et al. .......... | 701/93 |
| 2005/0171678 A1 | * | 8/2005 | Takahashi et al. ......... | 701/104 |
| 2006/0178797 A1 | * | 8/2006 | Larsen et al. ............. | 701/54 |
| 2007/0067087 A1 | * | 3/2007 | Ohshima ................. | 701/93 |

FOREIGN PATENT DOCUMENTS

DE  41 33 060 A1  4/1993

OTHER PUBLICATIONS

German Office Action dated Aug. 6, 2010 for Application No. 102008013770.7; 7 pages.

* cited by examiner

*Primary Examiner* — Thomas Black
*Assistant Examiner* — Shelley Chen

(57) ABSTRACT

A system for limiting the speed of a vehicle includes a first module that generates a first torque signal based on a vehicle speed, a second module that generates a second torque signal based on a difference between a predetermined vehicle speed limit and the vehicle speed, and a third module that generates an output torque signal based on the first and second torque signals. The output torque signal is adapted to control the output torque of a motor.

8 Claims, 4 Drawing Sheets

MODEL BASED VEHICLE OVERSPEED ALGORITHM

This application claims the benefit of U.S. Provisional Application No. 60/918,613, filed on Mar. 16, 2007. The disclosure of the above application is incorporated herein by reference.

FIELD

The present disclosure relates to limiting a maximum speed of a vehicle.

BACKGROUND

The statements in this section merely provide background information related to the present disclosure and may not constitute prior art.

Modern road vehicles generally ride on pneumatic tires that have a maximum speed rating. The maximum speed rating can be programmed into an engine controller of the vehicle. The engine controller then cuts off fuel to the engine when the vehicle speed reaches the maximum speed rating of the tires. Such arrangements are adequate in keeping the vehicle from exceeding the maximum speed rating of its tires, but the engine power cut-out and re-engagement cause erratic engine operation that can be unpleasant to drive. Other methods of limiting the vehicle speed include reducing the output torque of the engine when the vehicle reaches the maximum speed rating; however the other methods are empirical and challenging to calibrate to a particular vehicle and powertrain combination.

SUMMARY

A system for limiting the speed of a vehicle includes a first module that generates a first torque signal based on a vehicle speed, a second module that generates a second torque signal based on a difference between a predetermined vehicle speed limit and the vehicle speed, and a third module that generates an output torque signal based on the first and second torque signals. The output torque signal is adapted to control the output torque of a motor.

In other features at least one of the first and second modules includes a look-up table. The third module sums the first and second torque signals to form the output torque signal. The second torque signal is negative when the vehicle speed is greater than the vehicle speed limit. The second torque signal is positive when the vehicle speed is greater than the vehicle speed limit.

In other features the system includes the motor. The motor is at least one of an internal combustion engine and an electric motor.

A method for limiting the speed of a vehicle includes generating a first torque signal based on a vehicle speed, generating a second torque signal based on a difference between a predetermined vehicle speed limit and the vehicle speed, and generating an output torque signal based on the first and second torque signals. The output torque signal is adapted to control the output torque of a motor.

In other features at least one of generating the first torque signal and generating the second torque signal includes employing a look-up table. Generating the output torque signal includes summing the first and second torque signals to form the output torque signal. The second torque signal is negative when the vehicle speed is greater than the vehicle speed limit. The second torque signal is positive when the vehicle speed is greater than the vehicle speed limit. The motor is at least one of an internal combustion engine and an electric motor.

A speed-limited powertrain for a vehicle includes a motor that develops torque for propelling the vehicle, a speed sensor that generates a speed signal based on a speed of the vehicle, and a control module that generates a torque control signal based on the speed signal, a predetermined maximum speed, and an axle torque of the vehicle. The torque control signal is adapted to control the output torque of the motor and the output torque of the motor is related to the axle torque by a gear ratio.

In other features the motor is an internal combustion engine. The powertrain includes an electronic throttle body that meters combustion air to the internal combustion engine based on the torque control signal. The control module varies at least one of a fuel flow rate, a fuel injection timing, and an ignition timing to the internal combustion engine based on the torque control signal.

In other features the motor is an electric motor. The control module varies an amount of electric power that is delivered to the internal combustion engine based on the torque control signal.

In other features the controller further includes a first module that generates a first torque signal based on the vehicle speed and an aerodynamic drag coefficient of the vehicle, a second module that generates a second torque signal based on a difference between the predetermined maximum speed and the vehicle speed signal, and a third module that generates torque control signal based on a sum of the first and second torque signals.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
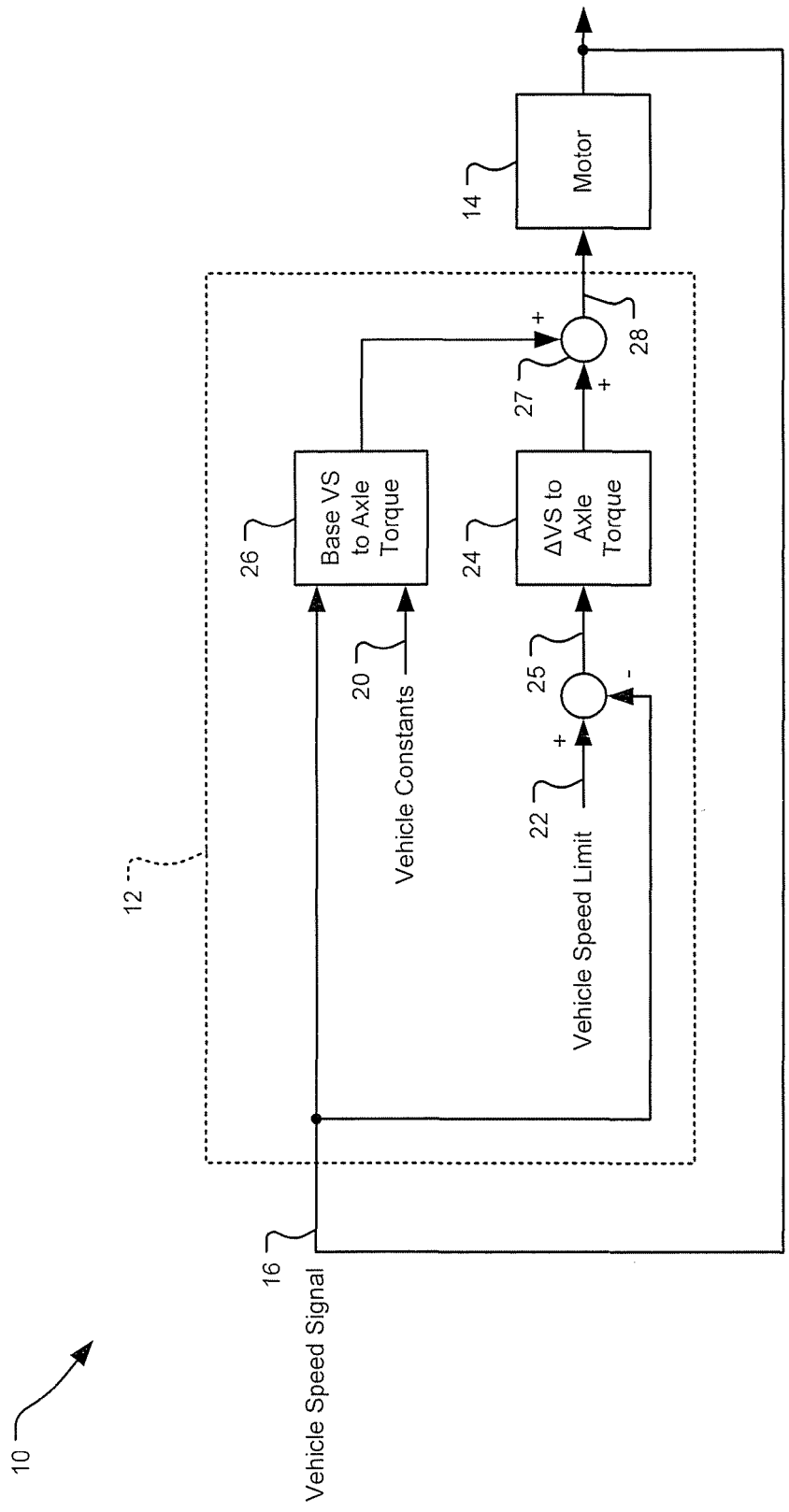
FIG. 1 is a functional block diagram of speed limiting system for a vehicle.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, one of several embodiments is shown of a vehicle speed limiting system 10. Speed limiting system 10 employs a torque-based control that limits motor torque as the vehicle approaches a predetermined maximum speed. The predetermined maximum speed is generally less than or equal to a maximum speed rating of the vehicle tires. It should appreciated by those skilled in the art that the predetermined maximum speed may also be associated with other factors such as vehicle stability, road and/or weather conditions, condition of the driver, and the like. Speed limiting system 10 can be more pleasant to drive than the prior art since speed limiting system 10 does not abruptly turn off fuel to the engine when the vehicle reaches the predetermined maximum speed.

Speed limiting system 10 includes a control module 12 that controls the output torque of a motor 14. Control module 12 can be included in an engine or powertrain control module that includes a processor and memory and is otherwise familiar to those skilled in the art. Motor 14 can be implemented with an internal combustion engine, an electric motor, or a combination of the two such as a hybrid-electric powertrain. Control module 12 can control the output torque of a gasoline internal combustion engine by communicating a desired throttle position signal to an electronic throttle body of the engine, varying fuel injection quantities and/or timing, and/or varying ignition timing to the engine. Control module 12 can control the output torque of a diesel internal combustion engine by controlling the fuel flow rate and/or injection timing of the fuel that is delivered to the engine. Control module 12 can control the output torque of an electric motor by controlling the amount of electric power that is delivered to the motor.

Control module 12 receives a vehicle speed signal 16. The vehicle speed signal 16 can be generated by a vehicle speed sensor that generates electrical pulses in accordance with the rotation of a wheel, axle, and/or propulsion shaft of the vehicle. Vehicle speed signal 16 may also be generated using other methods known in the art such as analyzing data from a global positioning system (GPS), Doppler radar and/or sonar, and the like.

Control module 12 includes a first module 24 that generates a first torque value based on a difference or error signal 25. Error signal 25 is based on a difference between a predetermined vehicle speed limit 22 and the vehicle speed that is represented by vehicle speed signal 16. The first torque value represents an amount of torque that is available to accelerate the vehicle from its present speed to vehicle speed limit 22. First module 24 can be implemented with a look-up table. In some embodiments error signal 25 passes through a proportional, integral, and/or derivative filter before it is communicated to the input of first module 24.

Control module 12 includes a second module 26 that generates a second torque value based on vehicle constants 20 and the vehicle speed that is represented by vehicle speed signal 16. Vehicle constants 20 represent properties of the vehicle such as aerodynamic drag, rolling resistance, rolling radius of the drive wheels, and the like. The second torque value represents the torque that is needed to keep the vehicle moving at its present speed without accelerating. Second module 26 can be implemented with a look-up table.

A summing module 27 sums the first torque value and the second torque value to arrive at a desired torque for motor 14. Summing module 27 generates a torque command signal 28 that communicates the desired torque to motor 14. The torque command signal 28 can be implemented as one or more signals which are adapted to control the ETC, fuel injection flow rate and/or timing, ignition timing, electric power, and the like to motor 14 such that motor 14 achieves the desired torque. The output torque of motor 14 varies in accordance with torque command signal 28. Varying the output torque of motor 14 also causes the vehicle speed, and consequently vehicle speed signal 16, to adjust accordingly.

Figure 2:
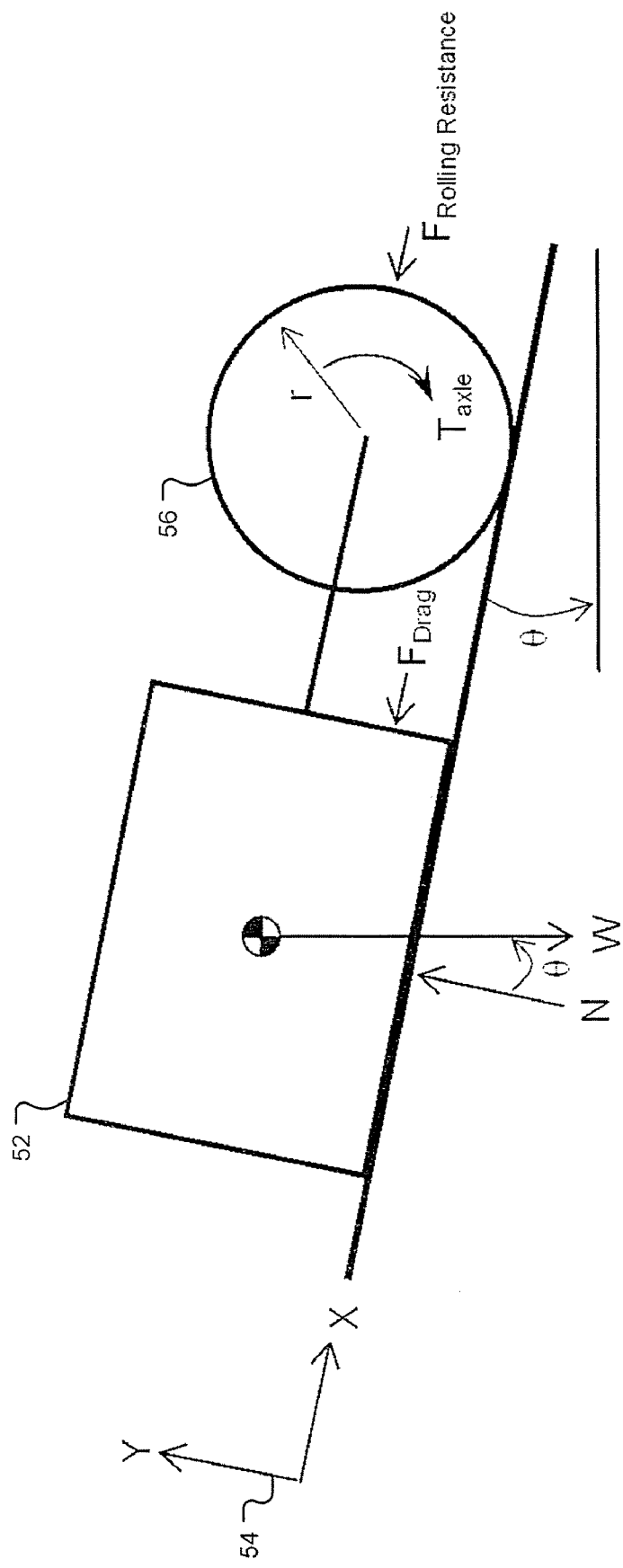
FIG. 2 is a free body diagram of a wheeled vehicle.

Referring now to FIG. 2, a free-body diagram 50 is shown of a wheeled vehicle. Diagram 50 can be employed to derive the look-up tables and/or equivalent transfer functions that are employed by first and second modules 24, 26.

A block 52 represents a mass of the vehicle. An angle $\theta$ represents a road grade or incline, with respect to horizontal, that the vehicle is driving on. If the road grade is unknown then $\theta$ can represent a typical or maximum incline that the vehicle is expected to be driven on. A variable r represents a rolling radius of a driving wheel of the vehicle. A variable $T_{axle}$ represents the axle torque at the driving wheel. It should be appreciated by those skilled in the art that $T_{axle}$ is related to the output torque of motor 14 by gear ratios and/or efficiencies of torque converters, transmissions, and/or differential gears that conduct torque between an output shaft of motor 14 and the axle. A variable $F_{Drag}$ represents aerodynamic drag on the vehicle. A variable $F_{Rolling\ Resistance}$ represents a rolling resistance that is presented by the wheels of the vehicle. An XY coordinate system 54 is referenced to the vehicle. A direction N is normal to a direction of travel of the vehicle parallel to the X-axis. W represents the weight of the vehicle.

Applying Newton's law to solve forces in the X direction yields the following equations:

$$\Sigma F_{x,Block} = W \cdot \sin(\theta) + F_{Wheel\_Block} - F_{Drag} = ma_x \quad (1)$$

where $F_{x,block}$ represents a total force in the X axis on block 52, $F_{Wheel\_Block}$ represents a driving force that is exerted by wheel 56 on block 52, m represents the mass of block 52, and $a_x$ represents the acceleration of block 52 parallel to the X axis.

Assuming that there is no slip in the driveline $$\sum F_{x,Contact\_Patch} = \frac{T_{Axle}}{r} - F_{Rolling\_Resistance} - F_{Wheel\_Block} = ma_x, \quad (2)$$

Where $F_{x,Contact\_Patch}$ represents a friction force between wheel 56 and the road surface.

At steady-state vehicle speed the acceleration is zero and equations (1) and (2) can be combined to arrive at:

$$T_{Axle} = (F_{Drag} + F_{Rolling\_Resistance} - W \cdot \sin(\theta)) \cdot r \quad (3)$$

where $F_{Drag} = 0.0386 \cdot \rho_{air} \cdot C_{Drag} \cdot Area_{Front} \cdot Vel^2$ and $F_{Rolling\_Resistance} = W \cdot \cos(\theta) \cdot C_{Rolling\_Resistance}$. Combining equations (1), (2), and (3) gives $T_{Axle}$ as a function of the vehicle speed (represented by Velocity):

$$T_{Axle} = (0.0386 \cdot \rho_{air} \cdot C_{Drag\_Coefficient} \cdot Area_{Front} \cdot Velocity^2 + W \cdot \cos(\theta) \cdot C_{Rolling\_Resistance} - W \cdot \sin(\theta)) \cdot r \quad (4)$$

where $C_{Drag\_Coefficient}$ represents a drag coefficient of the vehicle, $\rho_{air}$ represents air density, and $Area_{Front}$ represents a frontal area of the vehicle.

Figure 3:
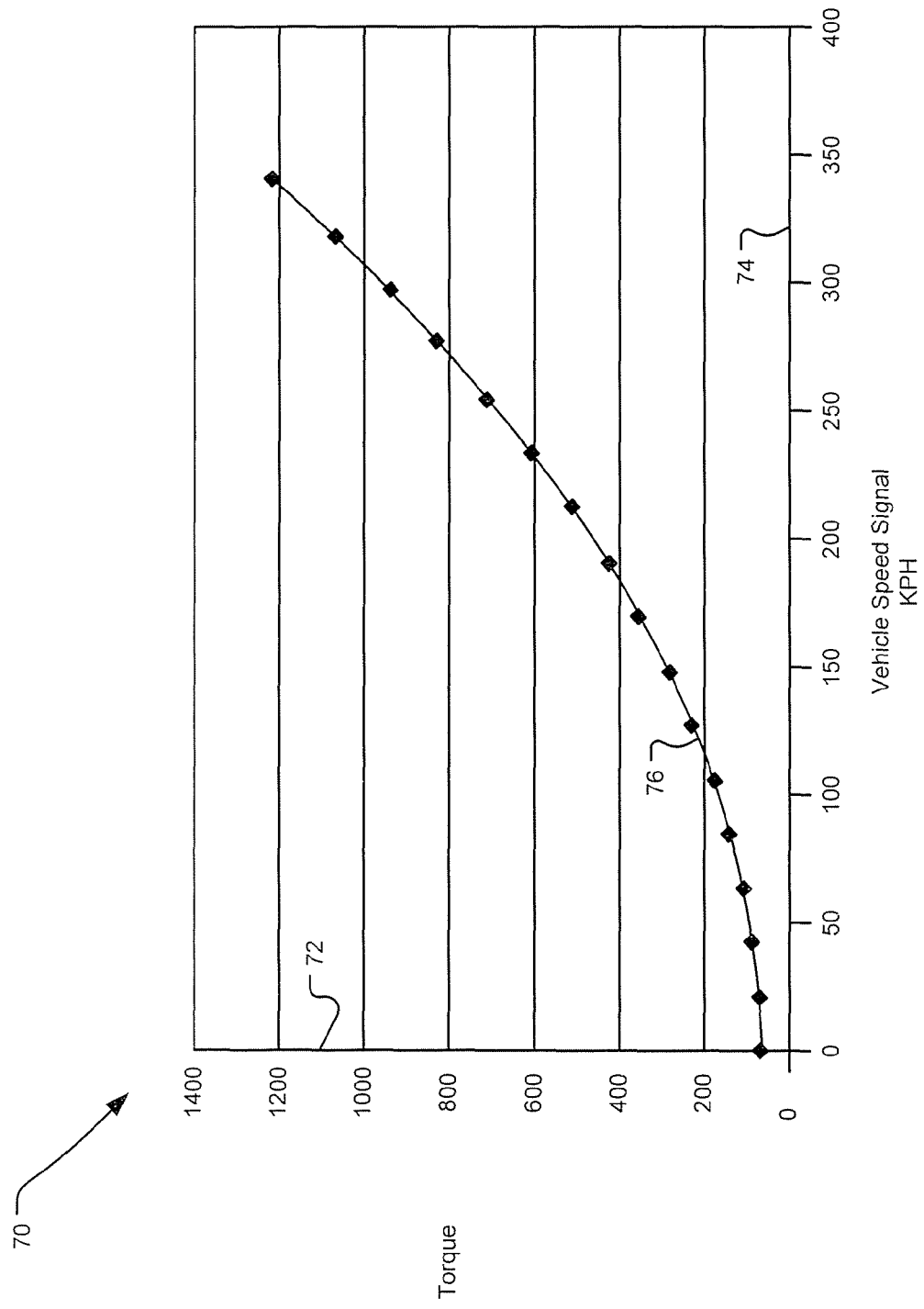
FIG. 3 is a graph that shows predetermined values that can be used in the control system of FIG. 2.

Referring now to FIG. 3, a graph 70 shows an example of a look-up table that can be employed by second module 26. Graph 70 shows torque as a function of the steady-state vehicle speed such as is expressed by equation (3). A vertical axis 72 represents the torque from motor 14. The torque from motor 14 is related to $T_{Axle}$ by the total gear ratio of the vehicle driveline. A horizontal axis 74 represents the steady-state vehicle speed. A curve 76 represents the results of equation (4) for various speeds.

Figure 4:
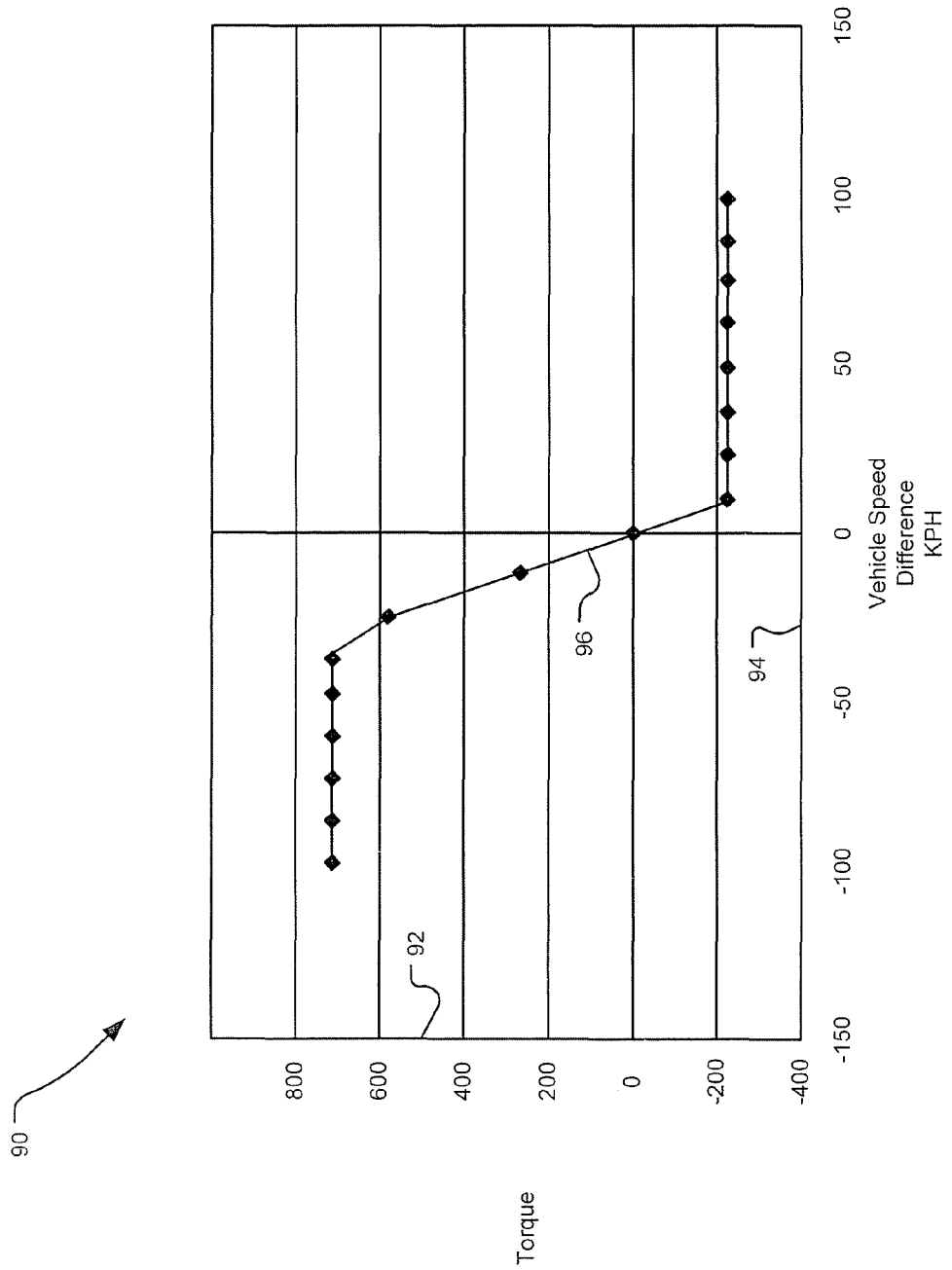
FIG. 4 is a FIG. 3 is a graph that shows predetermined values that can be used in the control system of FIG. 2.

Referring now to FIG. 4, a graph 90 shows an example of a look-up table that can be employed by first module 24. Graph 90 shows acceleration torque as a function of the difference between the actual vehicle speed and vehicle speed limit 22. The acceleration torque can be added to the steady-state torque from graph 70 to arrive at the torque limit for motor 14.

A vertical axis 92 represents an acceleration portion of the torque from motor 14. The acceleration portion of the torque from motor 14 is also related to $T_{Axle}$ by the total gear ratio of the vehicle driveline. A horizontal axis 94 represents the difference between the actual vehicle speed and vehicle speed limit 22. A curve 96 represents the acceleration torque at various corresponding positive (i.e. vehicle is going faster than vehicle speed limit 22) and negative speed errors. Curve 96 shows that when the vehicle speed error is positive then the acceleration torque is negative to reduce the total torque output from motor 14 and slow down the vehicle. Curve 96 also shows that when the vehicle speed error is negative then the acceleration torque is positive to increase the total torque output from motor 14 and speed up the vehicle.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A speed-limited powertrain for a vehicle, comprising:
   a motor that develops torque for propelling the vehicle;
   a speed sensor that generates a speed signal based on a speed of the vehicle; and
   a control module that (i) generates a first torque signal based on a difference between a predetermined maximum speed of the vehicle and a speed of the vehicle, wherein the predetermined maximum speed of the vehicle is a maximum speed that the vehicle can safely travel, (ii) generates a second torque signal based on the vehicle speed and an aerodynamic drag coefficient of the vehicle, and (iii) generates a torque control signal based on a sum of the first and second torque signals, wherein the torque control signal is adapted to control an output torque of the motor and the output torque of the motor is related to an axle torque by a gear ratio.

2. The powertrain of claim 1 wherein the motor is an internal combustion engine.

3. The powertrain of claim 2 further comprising an electronic throttle body that meters combustion air to the internal combustion engine based on the torque control signal.

4. The powertrain of claim 2 wherein the control module varies at least one of a fuel flow rate, a fuel injection timing, and an ignition timing to the internal combustion engine based on the torque control signal.

5. The powertrain of claim 1 wherein the motor is an electric motor.

6. The powertrain of claim 5 wherein the control module varies an amount of electric power that is delivered to the electric motor based on the torque control signal.

7. The powertrain of claim 1, wherein the predetermined maximum speed of the vehicle is based on a maximum speed rating of tires of the vehicle.

8. The powertrain of claim 1, wherein the predetermined maximum speed of the vehicle is based on at least one of vehicle stability, road conditions, weather conditions, and a condition of a driver of the vehicle.

* * * * *